United States Patent [19]

Bourgeault

[11] Patent Number: 4,635,181

[45] Date of Patent: Jan. 6, 1987

[54] BRIDGE CIRCUIT FOR REDUCED SWITCHING LOSSES

[75] Inventor: Leo B. Bourgeault, Wall, N.J.

[73] Assignee: Allied Corporation, Morris Township, Morris County, N.J.

[21] Appl. No.: 687,312

[22] Filed: Dec. 28, 1984

[51] Int. Cl.⁴ .......................................... H02M 7/538
[52] U.S. Cl. ...................................... 363/132; 363/98
[58] Field of Search ....................... 363/17, 56, 63, 98, 363/132

[56] References Cited

U.S. PATENT DOCUMENTS

| | | | |
|---|---|---|---|
| 3,294,981 | 12/1966 | Bose | 323/285 |
| 3,351,871 | 11/1967 | Swain | 331/57 |
| 4,270,164 | 5/1981 | Wyman et al. | 363/56 |
| 4,456,950 | 6/1984 | Cordy | 363/56 |

Primary Examiner—Patrick R. Salce
Assistant Examiner—Jeffrey Sterrett
Attorney, Agent, or Firm—Howard G. Massung

[57] ABSTRACT

A bridging type switching output stage having controlled switching devices and capacitors for reducing switching losses. The bridge configured output includes flywheel diodes connected in parallel around switching transistors. Active controlled switching devices such as SCRs are utilized for conducting current between capacitors which are connected around the bridge circuit inputs to reduce switching losses.

8 Claims, 4 Drawing Figures

BRIDGE CIRCUIT FOR REDUCED SWITCHING LOSSES

BACKGROUND OF INVENTION

1. Field of Invention

This invention relates to switching power supplies and more particularly to an output bridge circuit for reducing switching losses.

2. Description of the Prior Art

Electrical devices with switching type output sections for switching between DC voltages to provide a desired output waveform are known in the art. U.S. Pat. Nos. 3,294,981; 3,351,871; 4,270,164; and 4,456,950 are exemplary of supplies having a switching type output.

SUMMARY OF THE INVENTION

This invention teaches a power converter having a bridge configured switching output including active flywheel switching devices which are controlled to reduce switching losses. The bridge configured output utilizes four switching transistors and their parallel flywheel diodes. Capacitors are disposed around the bridge for storing energy during operation of the bridge circuit. Control and sensing devices are provided for sensing when switching transistors are turned off and for activating the appropriate active flywheel switching devices to transfer energy to the capacitors.

Four silicon controlled rectifier circuits, one for each switching transistor are incorporated into the bridge circuit. Each SCR circuit is operated in conjunction with a capacitor. A control transformer is disposed to sense current flow from the power supply to the load. The current transformer has four secondary windings, one associated with each SCR circuit, to activate the associated SCR at an appropriate time to reduce switching losses.

BRIEF DESCRIPTION OF THE DRAWINGS

For a better understanding of the invention, reference may be had to the preferred embodiment exemplary of the invention shown in the accompanying drawings in which.

DESCRIPTION OF THE PREFERRED EMBODIMENT

Figure 3:
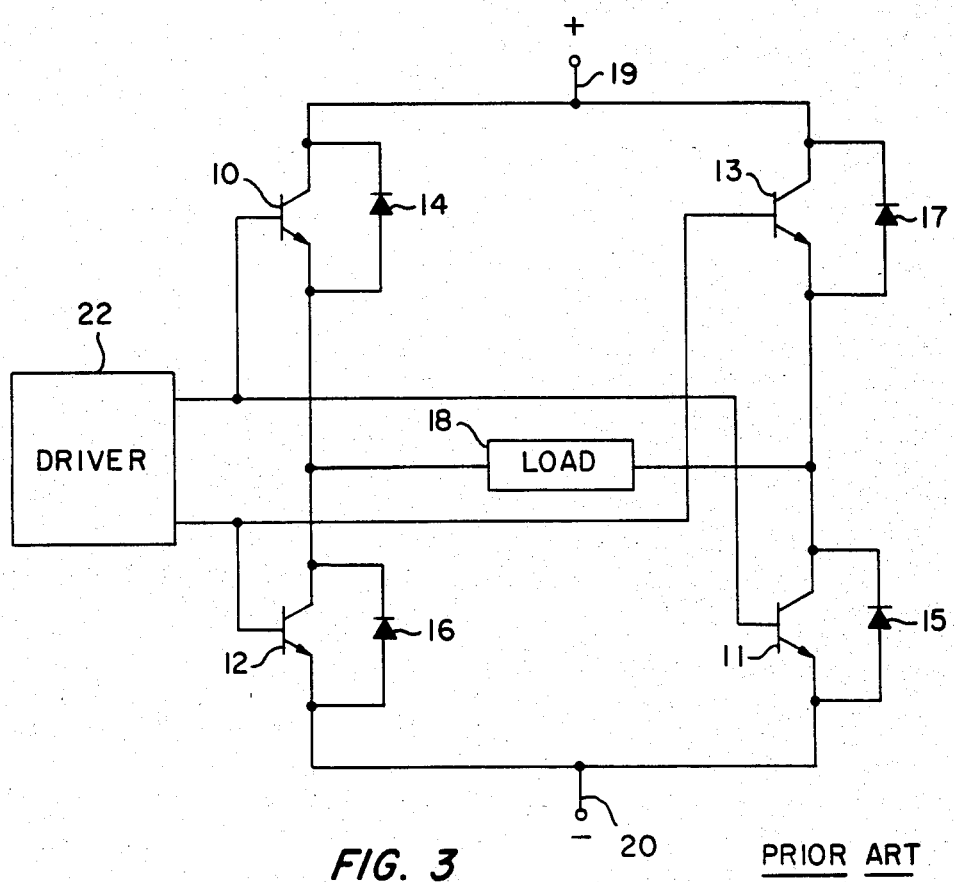
FIG. 3 illustrates a prior art switching type output circuit.

Referring to FIG. 3 there is shown a prior art bridge configured switching output circuit. The bridge circuit consists of four transistors, 10, ,11, 12, 13 and their associated flywheel diodes, 14, 15, 16, and 17 which are connected in a bridge configuration. A positive power bus 19 and a negative power bus 20 are selectively connected to load 18 by turning on and off transistors 10 through 13. A driver stage 22 provides signals to the bases of the transistors 10 through 13 for turning them on or off. A first pair of diagonally opposite transistors 10 and 11 are operated in unison to connect the postive voltage bus 19 to the left side of load 18 and the negative voltage bus 20 to the right side of load 18. A second pair of diagonally opposite transistors 12 and 13 are operated in unison to connect the positive voltage bus 19 to the right side of load 18 and the negative voltage bus 20 to the left side of load 18.

During initial operation of the circuit shown in FIG. 3 when the pair of transistors 10 and 11 are turned on a positive voltage will be applied to the left side of load 18 and a negative voltage will be applied to the right side, causing current flow from left to right through load 18. If switching transistors 10 and 11 are suddenly turned off, current will continue to flow through load 18, due to load and circuit inductance, but through flywheel diodes 16, 17. Current flow through load 18 will decrease, feeding energy into positive bus 19 and negative bus 20. When the current decreases to a selected value transistors 10 and 11 will again be turned on increasing current flow from left to right through load 18, putting energy into load 18. If current flow is desired from right to left through load 18, transistors 12 and 13, which operate in unison, can be energized. This will cause an increasing current to flow from right to left through load 18. When transistor 12 and 13 are switched off circuit and load 18 inductance will cause current to continue to flow in load 18 through flywheel diodes 14 and 15, but at a decreasing level.

Figure 4:
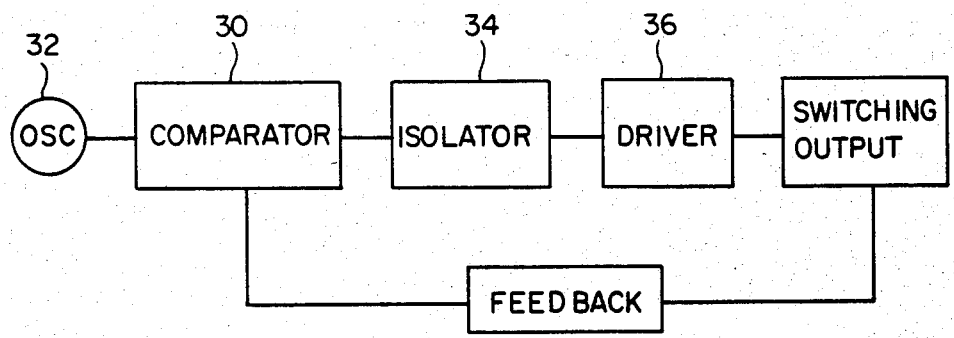
FIG. 4 shows a power converter which can utilize a switching type output according to the present invention.

Shown in FIG. 4 is a block diagram of a power supply which can utilize a reduced switching loss bridge output according to the teaching of the present invention. A feedback signal provided from a switching output to a comparator, of the type as described in copending U.S. patent application No. 687,041, titled Power Converter whose teachings are herein incorporated by reference. Comparator 30 compares a feedback signal to a reference signal, supplied by oscillator 32. Comparator 30 then provides signals through isolator 34 and driver 36 to selectively energize the switching transistors of a bridge configured switching output to supply the desired output waveform.

Figure 1:
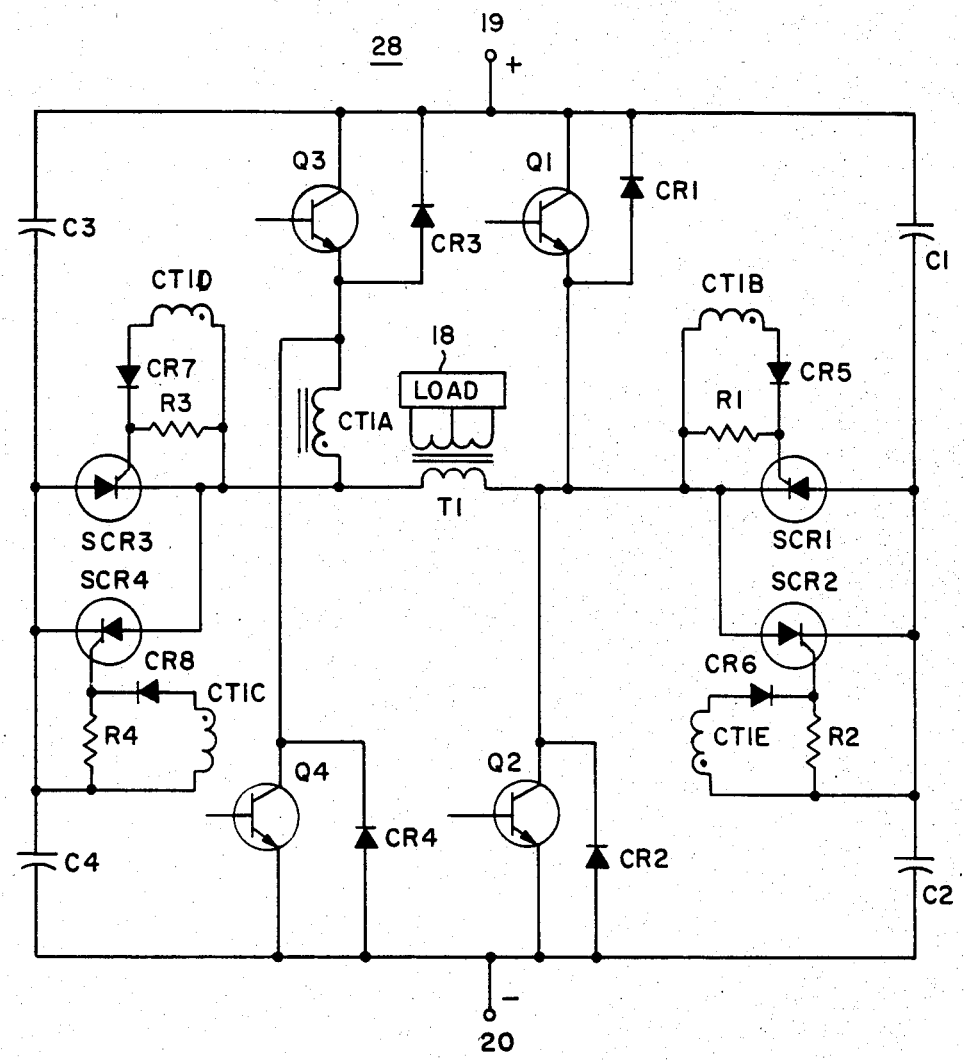
FIG. 1 is a switching output bridge circuit constructed according to the teaching of the present invention.

Referring now to FIG. 1, there is shown a bridge configured switching output circuit 28 which reduces switching losses. Four switching transistors Q1, Q2, Q3, Q4 with their associated flywheel diodes CR1, CR2, CR3, CR4 are provided. A power supply having a positive bus 19 and a negative bus 20 is connected to the input ends of the bridge 28 to provide energy to load 18 through a stepped down transformer T1. A current transformer CT1 having a primary winding CT1A is disposed so current from the power supply to the load flows there through. Four silicon controlled rectifier circuits, one for each transistor Q1 through Q4, are provided in the bridge circuit 28.

Silicon controlled rectifier circuits consist of SCR1 through SCR4, resistors R1 through R4, diodes CR5 through CR8 and the secondaries CT1B, CT1C, CT1D and CT1E of current transformer CT1, are disposed in the bridge circuit 28. Capacitors C1 and C2 are connected around the bridge circuit and capacitors C3 and C4 are also connected around the bridge circuit. The SCR circuits are connected between the output sides of the bridge and the interconnection of capacitors C1, C2 or C3, C4. Current transform CT1 is used to sense current flow to load 18 and through its secondary windings CT1 B, C, D and E activates the appropriate switching devices SCR1, SCR2, SCR3 or SCR4 to transfer energy to capacitors C1, C2, C3 or C4 when conducting switching transistors Q1, Q2, Q3 or Q4 are turned off.

Thus, energy rather than returning through the switching transistors to the positive bus 19 or the negative bus 20, is stored in capacitors C1, C2, C3 or C4. While current transformer CT1 is used for sensing current and provided control signal it should be recognized there are other means known in the art for current sensing and control. Likewise, controlled switching devices such as SCR1, SCR2, SCR3 and SCR4 can be replaced by other types of switching devices.

Figure 2:
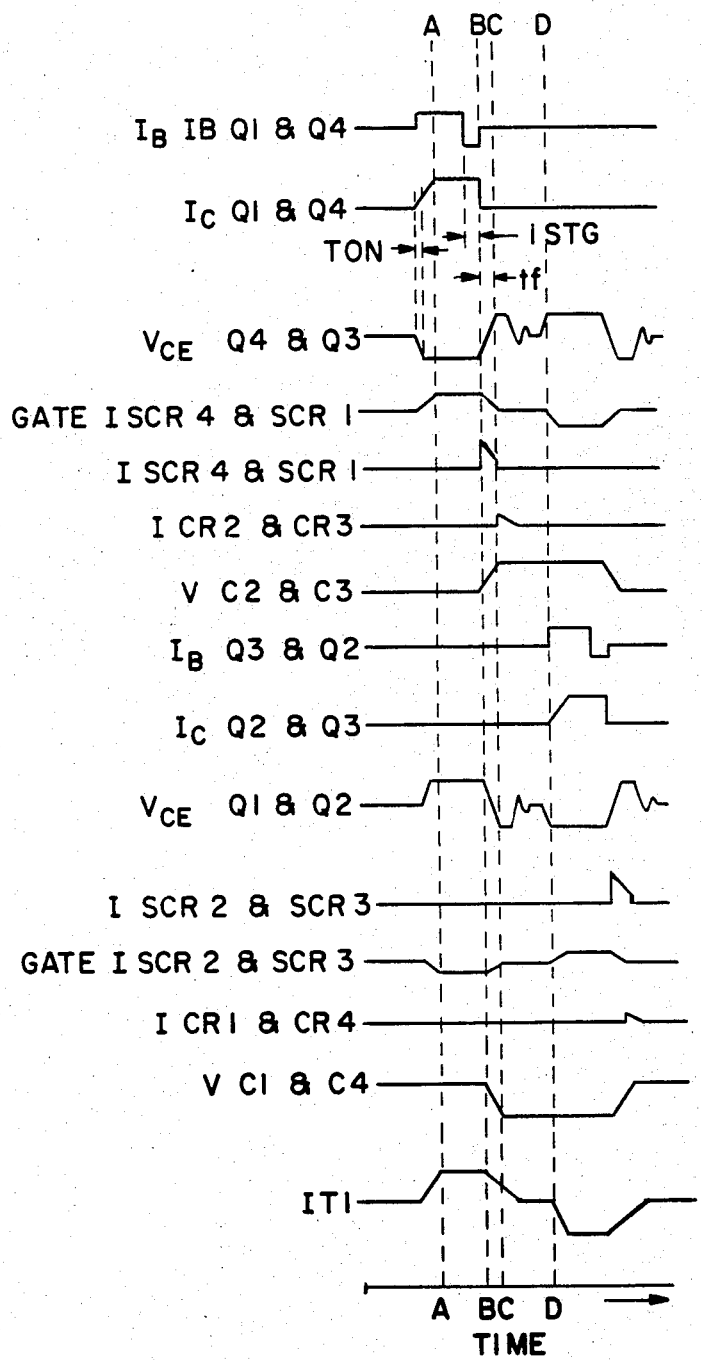
FIG. 2 illustrates waveforms at various points in the circuit of FIG. 1 during a cycle.

Referring now to FIG. 2 there are shown current and voltage waveforms at various times in an operating cycle. Beginning at time A transistors Q1 and Q4 are turned on conducting current from right to left through step down transformer T1. Due to the winding orientation, dot convention, of current transformer CT1, the gates of SCR1 and SCR4 are forward bias. At this point SCR1 and SCR4 will not conduct currents since their cathodes are more positive than their anodes. Note that when transistors Q1 and Q4 are conducting the cathode of SCR1 is clamped to the positive bus 19 and the anode of SCR4 is clamped to the negative bus 20.

When transistors Q1, Q4 are switched off at time B, the leakage, load and transformer inductance will maintain a continuing but decreasing current flow. At this time SCR1 and SCR4, whose gates are forward bias, will conduct and provide a path for current flow through capacitors C1, C2, C3 and C4. Thus, due to circuit and load inductance, the cathode of SCR4 will be driven up to the positive bus, clamped by CR3, resulting in C3 discharging and C4 charging. Similarly, the anode of SCR1 will be driven to the negative bus, clamped by CR2, resulting in C1 charging and C2 discharging. This results in energy flowing among the capacitors C1 through C4 rather than energy being fed through the switching transistors and into the power supply through diodes CR2, CR3.

When current flow through transformer T1 ceases at time C, the gate bias will be removed from SCR4 and SCR1. Since no ourrent is flowing, the cathode of SCR4 and the anode of SCR1 will float to some quiesent point, approximately half the supply voltage, due to the leakage resistance of the transistors and no supporting primary voltage on T1. This will turn off SCR1 and SCR4 since the cathodes will be at a higher potential than their anodes.

At time D, when transistors Q2 and Q3 are biased on, the capacitive voltages will be preconditioned and all SCRs turned off. As a result the transistors Q2 and Q3 do not sink any capacitive current. This yields a snubber circuit for a full wave bridge. At this time primary current will begin flowing in step down transformer T1 from left to right. The secondary windings CT1D and CT1E will be of a polarity to forward bias SCR2 and SCR3. However, SCR2 and SCR3 will not begin conducting at this time since their cathodes will be held more positive than their anodes. When transistors Q2 and Q3 are conducting the cathode of SCR3 is clamped to the positive bus 19 and the anode of SCR2 is clamped to the negative bus 20.

When transistors Q2 and Q3 are switched off, SCR2 and SCR3 will begin conducting and function in a manner similar to the operation of SCR1 and SCR4 described above. SCR2 and SCR3 will conduct and provide a path for current flow through capacitors C1, C2, C3 and C4. The cathode of SCR2 will be driven up to the positive bus voltage, clamped by CR1 resulting in C1 discharging and C2 charging. The anode of SCR3 will be driven to the negative bus, clamped by CR4, resulting in C3 charging and C4 discharging.

It can thus be seen when flywheel current is flowing through load 18 energy is transferred among capacitors C1, C2, C3, C4 rather than fed into positive bus 19 and negative bus 20.

What is claimed:

1. A bridge circuit for a switching output having four transistors, each with a parallel flywheel diode, connected to define a bridge having inputs connected to a DC power supply and having outputs for supplying a load the bridge circuit comprises:

a plurality of capacitors connecting across the bridge inputs;

a current sensing means disposed to sense current flow when energy is transferred between the load and the DC power supply and providing control signals;

a plurality of controlled switching devices responsive to control signals from said current sensing means to cause an energy transfer among said plurality of capacitors when the four transistors, are off and current is flowing in the load.

2. A bridge circuit as claimed in claim 1 wherein:

said current sensing means comprises a current transformer, having a plurality of secondary, windings, disposed for current flow therethru when energy is transferred between the load and the DC power supply; and, each of said plurality of controlled switching devices comprises an SCR with its gate connected to be activated by a secondary winding of said current transformer.

3. A switching type power supply, having a bridge configured output for supplying power to a load, comprising:

four transistors connected in a bridge configuration;

four flywheel diodes one connected in parallel around each switching transistor;

a first pair of controlled switching devices, connected to opposite sides of the load, which start to conduct when one diagonially opposite pair of the output switching transistors are turned off and a second pair of controlled switching devices, connected to opposite sides of the load, which start to conduct when the other diagonially opposite pair of output switching transistors are turned off; and, capacitive means connected around said bridge configured output for transferring energy with the load, through the conducting first or second pair of controlled switching devices, when the first or second pair of controlled switching devices conduct current.

4. A switching type power supply as claimed in claim 3 comprising:

current sensing for sensing when current is flowing to said load and providing control signals to activate either said first pair of controlled switching devices or said second pair of controlled switching devices.

5. A switching type power supply as claimed in claim 4 wherein:

said first and second pairs of controlled devices are SCRs; and, said capacitive means comprises capacitors connected in series around the bridge configured input.

6. A bridge circuit for a switching output comprising:

four transistors each with a parallel flywheel diode connected in parallel to define a bridge having inputs connected to a DC power supply and having an output for supplying a load;

a first pair of capacitors connected in series across the bridge inputs;

a second pair of capacitors connected in series across the bridge inputs;

current sensing means disposed to have current flowing there through when energy is transferred between the load and the power supply, and having four control outputs;

four SCRs one associated with each control output of said current sensing means, a pair of which SCRs are energized when a first pair of bridge transistors are turned off to cause current flow between the capacitor pairs and a second pair of which SCRs are energized when a second pair of bridge transistors are turned off to cause circuit flow between the capacitor pairs.

7. A bridge circuit as claimed in claim 6 wherein: said current sensing means comprises a current transformer and each control output comprises a secondary winding.

8. A switching type power supply having a bridge configured output for supplying a load, said power supply comprising:

four transistors connected in a bridge configuration;

four flywheel diodes one connected in parallel around each switching transistors;

a first pair of SCRs which start to conduct when one pair of the output switching transistors are turned off and a second pair of SCRs which start to conduct when the second pair of output switching transistors are turned off; and capacitive means connected around said bridge configured output and connected to said first and second pair of SCRs for transferring energy between the load through the conducting SCRs.

* * * * *